(12) United States Patent
Ye (10) Patent No.: US 8,898,775 B2
(45) Date of Patent: Nov. 25, 2014

(54) METHOD AND APPARATUS FOR DETECTING THE MALICIOUS BEHAVIOR OF COMPUTER PROGRAM

(75) Inventor: Chao Ye, Beijing (CN)

(73) Assignee: Bejing Rising Information Technology Co., Ltd., Beijing (CN)

( * ) Notice: Subject to any disclaimer, the term of this patent is extended or adjusted under 35 U.S.C. 154(b) by 285 days.

(21) Appl. No.: 12/738,031

(22) PCT Filed: Oct. 15, 2008

(86) PCT No.: PCT/CN2008/072698
§ 371 (c)(1),
(2), (4) Date: Jul. 15, 2010

(87) PCT Pub. No.: WO2009/049555
PCT Pub. Date: Apr. 23, 2009

(65) Prior Publication Data
US 2010/0293615 A1  Nov. 18, 2010

(30) Foreign Application Priority Data
Oct. 15, 2007 (CN) .......................... 2007 1 0162442

(51) Int. Cl.
*G06F 11/00* (2006.01)
(52) U.S. Cl.
USPC .......................................................... 726/22
(58) Field of Classification Search
USPC ..................................... 713/201; 726/22–25
See application file for complete search history.

(56) References Cited

U.S. PATENT DOCUMENTS

| H2196 H | * | 7/2007 | Tester | 726/22 |
| 7,694,134 B2 | | 4/2010 | Witt et al. | |
| 8,561,192 B2 | | 10/2013 | Ye | |
| 2002/0077803 A1 | | 6/2002 | Kudoh et al. | |
| 2004/0010718 A1 | * | 1/2004 | Porras et al. | 713/201 |
| 2004/0049693 A1 | | 3/2004 | Douglas | |
| 2004/0193912 A1 | | 9/2004 | Li et al. | |
| 2006/0037075 A1 | * | 2/2006 | Frattura et al. | 726/22 |

(Continued)

FOREIGN PATENT DOCUMENTS

| CN | 1409222 | 4/2003 |
| CN | 1550950 | 12/2004 |

(Continued)

OTHER PUBLICATIONS

International Search Report corresponding to International Application No. PCT/CN200S/072698 dated Feb. 19, 2009.

(Continued)

*Primary Examiner* — Anthony Brown
(74) *Attorney, Agent, or Firm* — Jenkins, Wilson, Taylor & Hunt, P.A.

(57) ABSTRACT

A method and an apparatus for detecting malicious behavior of a computer program are disclosed. The method and apparatus analyze behavior characteristics of a malicious program using the concept of a monitored process set. The method comprises: monitoring an action executed by the computer program; searching for a process set associated with the monitored action within a library of monitored process sets, the process set including information of suspicious processes correlated with each other in creating relationships; and if the process set associated with the monitored action is found, judging whether the monitored action belongs to malicious behavior by correlation analysis based on information recorded in the process set found.

13 Claims, 8 Drawing Sheets

(56) References Cited

U.S. PATENT DOCUMENTS

| | | | |
|---|---|---|---|
| 2006/0075494 A1* | 4/2006 | Bertman et al. | 726/22 |
| 2006/0136720 A1 | 6/2006 | Armstrong et al. | |
| 2007/0107052 A1 | 5/2007 | Cangini et al. | |
| 2007/0150956 A1 | 6/2007 | Sharma et al. | |
| 2007/0209076 A1 | 9/2007 | Porter et al. | |
| 2010/0306851 A1 | 12/2010 | Zhou | |
| 2010/0313269 A1 | 12/2010 | Ye | |

FOREIGN PATENT DOCUMENTS

| | | |
|---|---|---|
| CN | 1581088 | 2/2005 |
| CN | 1818823 | 8/2005 |
| CN | 1845120 | 10/2006 |
| CN | 1885224 | 12/2006 |
| EP | 1 630 711 | 3/2006 |
| WO | WO02/14987 | 2/2002 |
| WO | WO02/061510 | 8/2002 |
| WO | WO 2004066112 A2 * | 8/2004 |
| WO | WO2009/049554 | 4/2009 |
| WO | WO2009/049555 | 4/2009 |
| WO | WO2009/049556 | 4/2009 |

OTHER PUBLICATIONS

Advisory Action corresponding to U.S. Appl. No. 12/738,037 dated Dec. 6, 2012.
European Search Report corresponding to European Patent Application No. EP20050018479 dated Jan. 3, 2006.
International Preliminary Report on Patentability (Chapter I of the patent Cooperation Treary) corresponding to International Patent Application No. PCT/CN2008/072694 dated Apr. 20, 2010.
International Preliminary Report on Patentability (Chapter I of the Patent Cooperation Treaty) corresponding to International Patent Application No. PCT/CN2008/072698 dated Apr. 20, 2010.
International Preliminary Report on Patentability (Chapter I of the Patent Cooperation Treaty) corresponding to International Patent Application No. PCT/CN2008/072699 dated Apr. 20, 2010.
International Search Report corresponding to International Patent Application No. PCT/CN2007/072694 dated Jan. 22, 2009.
International Search Report corresponding to International Patent Application No. PCT/CN2008/072699 dated Jan. 22, 2009.
Interview Summary corresponding to U.S. Appl. No. 12/738,023 dated Nov. 9, 2012.
Official Action corresponding to U.S. Appl. No. 12/738,023 dated Feb. 28, 2013.
Official Action corresponding to U.S. Appl. No. 12/738,037 dated Apr. 12, 2012.
Official Action corresponding to U.S. Appl. No. 12/738,037 dated Aug. 24, 2012.
Decision of Rejection corresponding to Chinese Patent Application No. 200710180317.8 dated Jun. 8, 2010.
Official Action corresponding to Chinese Patent Application No. 200710180317.8 dated Jun. 5, 2009.
Official Action corresponding to Chinese Patent Application No. 200710180317.8 dated Feb. 5, 2010.
Supplementary European Search Report corresponding to European Patent Application No. 08839571.0 dated Apr. 12, 2012.

* cited by examiner

METHOD AND APPARATUS FOR DETECTING THE MALICIOUS BEHAVIOR OF COMPUTER PROGRAM

FIELD OF THE INVENTION

The present invention relates to a computer protection method and apparatus, and more particularly, to a method and an apparatus for detecting timely and accurately malicious behavior of a computer program based on behavior characteristics of the computer program.

BACKGROUND

Since the first computer virus in the world was born in 1983, computer viruses have been evolved and updated continuously with the development of computer and network technologies over the last twenty years. Now, computer viruses, such as Trojans, worms and backdoors, can not only destroy computer systems, but also steal important information, such as the password of user's accounts, thereby threatening seriously the normal usage of computers, and even possibly causing great economic loss. Therefore, how to prevent viruses from intruding has become the most concerned focus.

One of the important steps of preventing a virus from intruding is to recognize the virus before its infringement, i.e., virus scanning, in order to inhibit it from further infringing on a computer system by taking appropriate measures timely. One of virus-scanning methods commonly used by current antivirus software is signature scanning. That is, the files to be examined are scanned using signatures extracted from virus samples, to detect and eliminate files infected by viruses.

However, in such traditional virus-scanning method, the signatures of the viruses are extracted only after the virus samples are captured, resulting that virus scanning and killing always lag behind the emergence of the viruses. For example, when a new virus emerges, a user will be infringed on, even if he has installed such antivirus software. This problem can only be solved after the upgrade of the antivirus software and the update of the virus library, which, however, lags seriously behind the emergence of the virus.

Now, new unknown viruses and new varieties of the existing viruses emerge endlessly, meanwhile, some anti-scanning technologies aiming at the traditional method also emerge. Thus, the disadvantage of lagging of the traditional virus-scanning method becomes more and more obvious, and real-time monitoring programs depending on the traditional method are practically being useless.

Recently, considering disadvantages of the traditional signature scanning, a computer protection method based on behavior characteristics of a computer program is proposed in antivirus field. In this method, by intercepting an action of a computer program, it could be analyzed whether this action is initiated by a virus or not. This computer protection method could recognize new varieties of the existing viruses and some relatively-simple new viruses, to a certain degree. However, for some viruses with good concealment which implement invasive behavior by calling a system program or a secure program, the probability of success of this protection method remains lower.

For example, one recently prevalent backdoor, "Backdoor.GPigeon", is a virus with good concealment. After its main program "c:\A.exe" runs, it replicates itself to the system directory "c:\windows\", renames its replica as "wservices.exe", and then exits after starting the replica "wservices.exe". After the starting of "wservices.exe", "iexplore.exe" (a system file) within the system is started directly, and then the process image of "wservices.exe" is written into the process space of "iexplore.exe", and the execution privilege is obtained so as to make an infringement using "iexplore.exe".

In the "Backdoor.GPigeon", a virus runs hiddenly within the normal system program "iexplore.exe", the procedure in which the virus makes an infringement involves successively three processes, i.e. "A.exe", "wservices.exe" and "iexplore.exe", and the main program "A.exe" of the virus has already ended before real infringing behavior is implemented. Thus, the "Backdoor.GPigeon" may cheat virus-scanning software completely in monitoring of the actions, thus it hides virus code successfully into the process space of "iexplore.exe". In this case, with the existing simple method for behavior and action analysis, it is difficult to recognize the viruses with good concealment.

At present, with the development of computer technologies, the viruses with good concealment, like "Backdoor.GPigeon", become more and more prevalent. Therefore, there is a need for a new computer protection method to recognize such malicious programs which makes infringements by initiating a plurality of processes.

SUMMARY

One of objects of the present invention is to provide a method and an apparatus for detecting malicious behavior of a computer program. With the method and apparatus in accordance with the present invention, the behavior of each malicious program involving a plurality of processes can be recognized, thereby finding out fundamentally which programs belong to viruses.

Another object of the present invention is to provide a method and an apparatus for detecting malicious behavior of a computer program such that any program that releases viruses can be found out efficiently.

In order to achieve the above objects, a method for detecting malicious behavior of a computer program in accordance with the present invention comprises: monitoring an action executed by the computer program; searching for a process set associated with the monitored action within a library of monitored process sets, the process set including at least information of at least one suspicious process correlated with each other in creating relationships; and if the process set associated with the monitored action is found, judging whether the monitored action belongs to malicious behavior by correlation analysis based on information recorded in the process set found.

According to the method of the present invention, a malicious program with good concealment, such as the "Backdoor.GPigeon", can be detected timely, because the malicious program initiating virus attacks by creating or calling a plurality of processes can be recognized timely and accurately, under the concept of the process set.

Furthermore, in order to achieve the above objects, the method in accordance with the present invention further comprises: receiving an notification that an antivirus engine has detected a virus, and obtaining information of a detected virus file; and the searching step comprises searching, within historical records of the process sets, for a process set containing the information of the detected virus file; and a process releasing the virus may be determined if the process set is found.

The method in accordance with the present invention combines the virus-scanning result of the antivirus engine with the process behavior monitoring, such that the malicious behavior can be detected more accurately and efficiently.

In addition, a computer protection apparatus corresponding to the above method is also provided in the present invention.

DETAILED DESCRIPTION

A method and an apparatus for detecting malicious behavior of a computer program in accordance with the present invention will be described in detail in conjunction with specific embodiments. For the purpose of disclosure, the following embodiments are described by taking only the Windows operating system as an example. However, it may be understood by those skilled in the art that the concept and spirit of the present invention may be also applicable to other computer operating systems, being not limited to the Windows operating system.

Current viruses or spyware, such as the "Backdoor.GPigeon" described above, no longer infringe on a computer in a single process, but execute malicious actions during creating and/or terminating a plurality of processes, such that antivirus software is cheated by them more easily during monitoring.

Furthermore, by analyzing today's numerous computer viruses and spyware, it can be found that a malicious program may be composed of some basic malicious behavior elements, and that not only one complete malicious program may involve a plurality of progresses, but also the implementation of these malicious behavior elements themselves may involve more than one process. Some malicious behavior elements abstracted through analysis are listed exemplarily below, although the present invention is not limited thereto.

Releasing virus file: It means that a process directly creates (or modifies a normal file as) a virus that can be recognized by an antivirus engine. When a virus file is generated in a local computer, its direct creator is of high possibility to be a virus releaser or downloader.

Self-replicating: It means that a process creates a replica directly or indirectly. This replica may be created directly by a malicious program A, or may be replicated by the malicious program A through calling other secure programs, such as the SHELL program.

Self-modifying self-replicating: It means that a process creates or modifies a application program, and the code area where the entry point of the modified application is located is the same as the code area where the entry point of a program file corresponding to the process is located, for example, the virus "Worm.WhBoy".

Releasing program file: It means that a process releases directly a program file of a replica of another process. The program file may be an executable file (EXE) or a dynamic link library (DLL).

Starting self-released program: It means that a process runs directly or indirectly a program file which may be created by the process or by a process associated with the process. For instance, the malicious program A releases a program B, and calls SHELL to start the program B.

Establishing self-starting correlation: It means that a process creates or modifies a self-starting item (e.g., a startup item in the registry) directly or indirectly, such that a program file of the process or an associated program file can be started automatically by the system. Here, the program of a process creating the self-starting item may be the malicious program A, or may be "services.exe" that has already existed in the system.

Installing self-released service: It means that a process installs a system service directly or indirectly, for example, the malicious program A will release several executable files and registers these executable files as services.

Loading self-released driver: It means that a process loads directly or indirectly a driver which is created by a loading process directly or indirectly. For example, the malicious program A releases a driver B and registers the driver B as a service starting mode, and the driver B is loaded by the process "services.exe" that has already existed in the system.

Terminating process: It means that a process terminates another normal process directly or indirectly. Likewise, an initiator which terminates the process may be the malicious program A or may be a process terminating tool, which is provided by the operating system (e.g., "taskkill.exe" in the Windows operating system) and called by the malicious program A.

Creating remote thread: It means that a process creates a remote thread directly or indirectly in another process space, in order to intrude into the other process.

Simulating input (keyboard, mouse, and etc.): It means that a process simulates directly or indirectly input for a window of another process, for example, sending QQ messages ceaselessly.

Sending Windows message: It means that a process sends a Windows message WM_GETTEXT directly or indirectly to a window of another process in order to obtain contents of the window.

Setting self-released program hook: It means that a process sets a global message hook, and the dynamic link library corresponding to the message hook is created by the same process directly or indirectly. For example, the malicious process A releases a dynamic link library B which contains a hook handling function and a program C which sets the global hook, and then runs the program C, such that the program C would set the global hook by using the hook handling function in the dynamic link library B as a parameter.

It can be seen easily from the malicious behavior elements summarized above that each of the behavior elements may involve a plurality of the correlated processes that are created successively. In this case, it is difficult to recognize the malicious behavior accurately by intercepting an action in a single process.

In this regard, the present invention proposes the concept of a monitored process set. For the sake of simplicity, the "monitored process set" is referred to as "process set" hereinafter, and thus the process set as mentioned herein should mean a process set monitored by protection software.

According to an embodiment of the present invention, each process set includes information of one or more suspicious processes correlated with each other in creating relationships. Taking the malicious behavior of "terminating process" described above as an example, assuming that a malicious process "A.exe" has been included in a process set α and the process "A.exe" calls a tool "Taskkill.exe" provided by the operating system to terminate another normal process, i.e., a child process "Taskkill.exe" is established. At this point, there is a direct relationship between the parent process "A.exe" and its child process "Taskkill.exe" which implement collectively the behavior of intentionally terminating another process. Thus, according to the principle of the present invention, the child process "Taskkill.exe" is also included in the process set α. Thus it can be seen that the process set α logically embodies the common behavior of one or more suspicious correlated processes contained herein. This logical correlation provided by the process set is very beneficial to the recognition of the malicious behavior.

According to an embodiment of the present invention, the process set proposed in the present invention divides various correlated processes in the system logically. Each process set includes identifiers (process ID) of suspicious processes contained therein and information of program files corresponding to the processes, such as full path information of the program files (PE files). In addition, because certain types of malicious behavior can be detected only by tracing back historical data, such as information of a file released by the parent process, the process set in accordance with the present invention can also store historical records of each process action in the set. For example, the historical records may include ID of the created child processes, the created files, the modified files, and etc. However, the present invention is not limited thereto, and the historical records can further include other information, such as the action of accessing a network, and the like.

Therefore, the process set proposed in the present invention not only embodies the correlation between the respective processes, but also includes inherent relationships of the correlated processes regarding historical actions. This information will help to perform correlation analysis on the monitored actions, to detect malicious behavior timely and accurately.

Taking several types of malicious behavior listed above as examples, the application of the concept of the process set proposed in the present invention in performing the correlation analysis on the monitored actions will be described in detail below in conjunction with specific examples of malicious programs.

Figure 1:
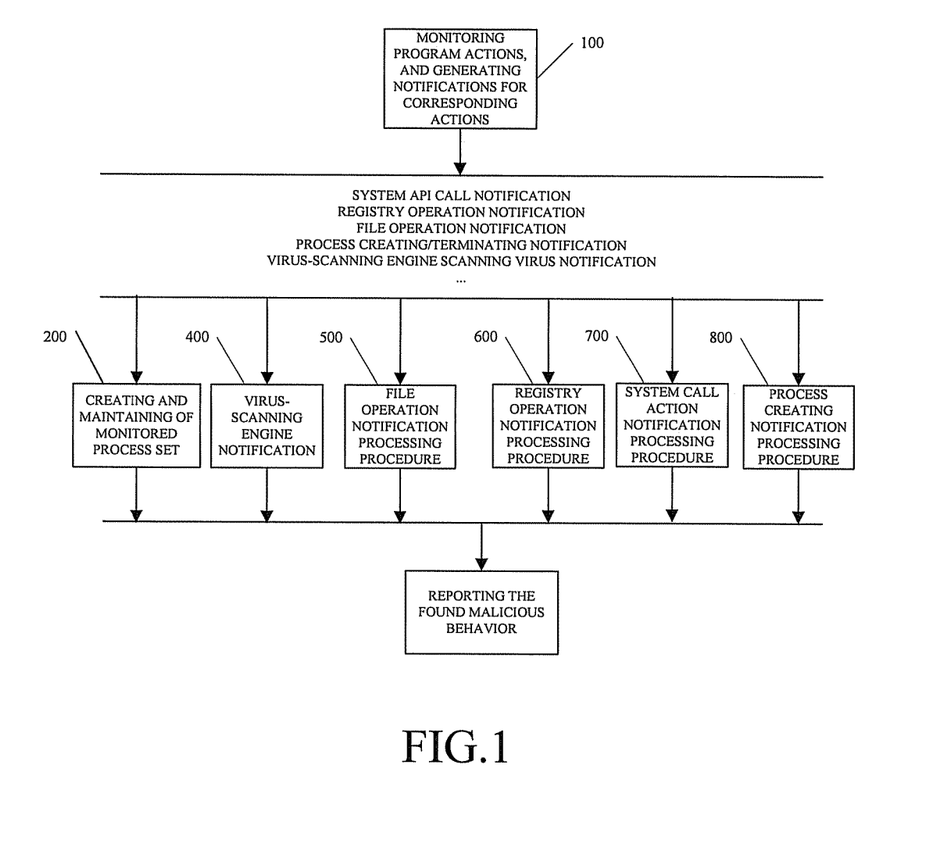
FIG. 1 illustrates an overall block diagram of an apparatus for detecting malicious behavior of a program in accordance with one embodiment of the present invention.

FIG. 1 illustrates an overall block diagram of an apparatus for detecting malicious behavior of a computer program in accordance with an embodiment of the present invention.

As shown in FIG. 1, a monitoring module 100 of the computer protection software monitors actions of the respective programs, and sends a corresponding action notification for each of the monitored actions, such as a process creating/terminating notification, a virus-scanning engine scanning virus notification, a file operation notification, a registry operation notification, a system API call notification, and etc. Then, each processing sub-module performs a corresponding sub-procedure in response to each notification, according to the notifications for the monitored actions. These processing sub-modules includes a process set maintaining sub-module 200, a virus-scanning engine notification processing sub-module 400, a file operation notification processing sub-module 500, a registry operation notification processing sub-module 600, a system call action notification processing sub-module 700, and a process creating notification processing sub-module 800.

According to an embodiment of the present invention, the process set proposed in the present invention is maintained upon creation/termination of each process, for example, creating or revoking the process set, adding or removing information of a process in an existing process set, and the like. A specific procedure performed by the process set maintaining sub-module 200 will be described in detail hereinafter with reference to FIGS. 2 and 3.

As to the notifications for actions during running of each process (e.g., a file operation notification, a system call notification), each corresponding sub-module (400-800) will first search, within a library of process sets, for a process set associated with the action corresponding to the notification, e.g., a set including an initiator of the action, or a set including object information (e.g., the operated file) of the action in historical records. If the corresponding process set is found in the set library, then the correlation between the respective actions is analyzed in conjunction with characteristics of malicious behavior abstracted as above, based on the associated information provided by the process set, so as to recognize various types of malicious behavior. Specific procedures performed by these sub-modules will be described in detail hereinafter with reference to FIGS. 4-8.

Figure 2:
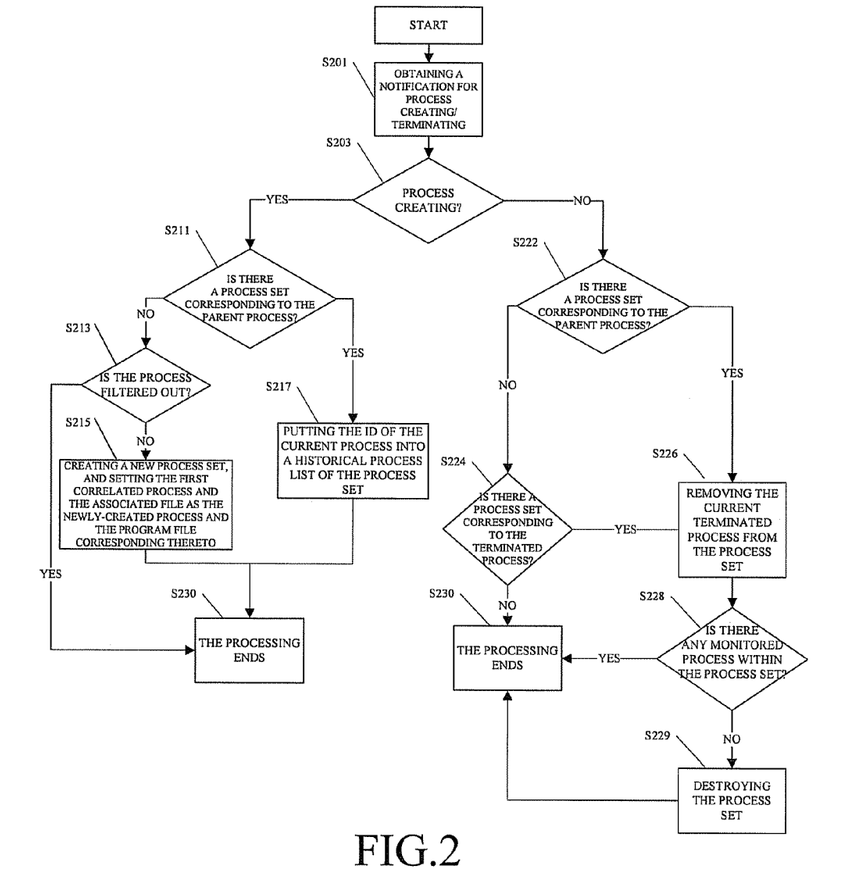
FIG. 2 illustrates a procedure of process set creating and maintaining in accordance with one embodiment of the present invention.

FIG. 2 illustrates a procedure of creating/maintaining a process set upon creation/termination of a process in accordance with the present invention. The procedure will still be described herein by taking the aforementioned "Backdoor.G-Pigeon" as an example.

Referring to FIG. 2, the sub-module 200 first obtains a process ID of a newly-created/terminated process and its parent process ID, after receiving a process creating/terminating notification (step S201). Then, it determines whether the received notification indicates the creation of the process (step S203). If so, the procedure goes to step S211, to create a process set and/or to add the new process; otherwise, the procedure goes to step S222, to remove the terminated process or to revoke an empty process set.

Here, assuming that the monitoring module sends a process creating action notification when the "Backdoor.GPigeon" program "A.exe" is created. At this point, in step S221, the library of existing process sets is searched based on the obtained parent process ID, in order to determine whether there exists a process set corresponding to the parent process. The "Backdoor.GPigeon" program "A.exe" is created for the first time, and its parent process is a secure process which is not monitored, thus, the determining result of the step S221 is NO, and the procedure proceeds to filtering step S213.

Figure 3:
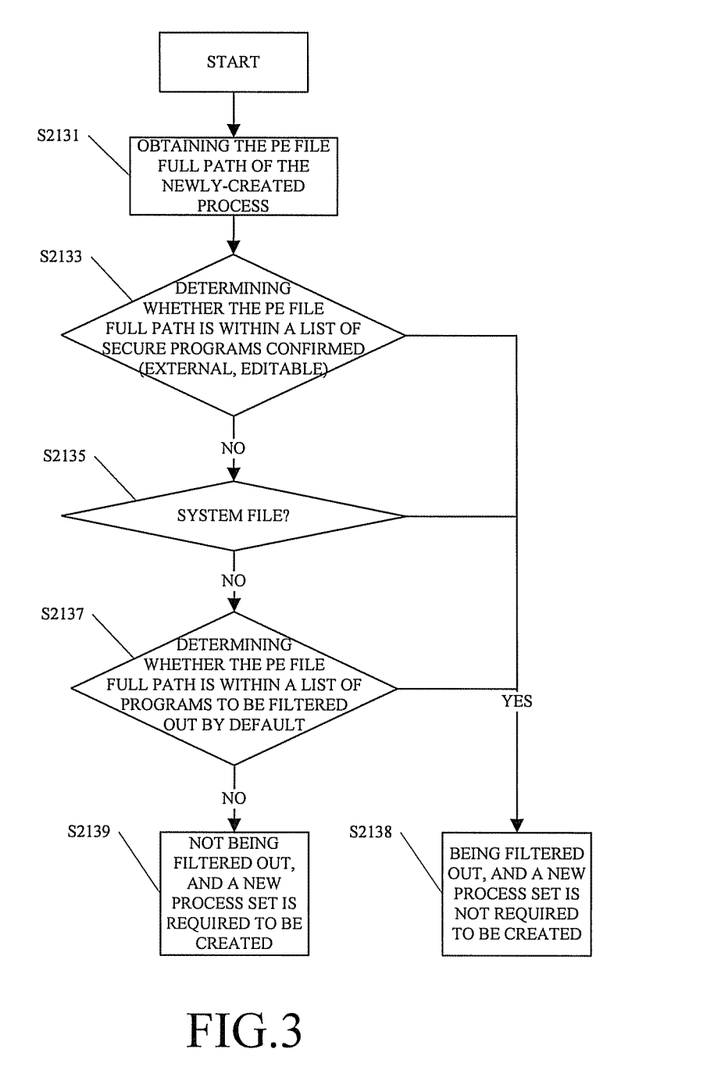
FIG. 3 illustrates a procedure of process filtering in accordance with one embodiment of the present invention.

The step S213 is an optional step, and its purpose is to determine, by filtering, whether the newly-created process is suspicious, i.e., whether or not a process set is required to be created for it. The specific filtering procedure is shown in FIG. 3. As shown in FIG. 3, the sub-module 200 first obtains full path information of an executable file corresponding to the newly-created process (step S2131). Then, it determines whether the full path of the executable file exists in an external secure program list (step S2133). This secure program list includes file information of secure programs authenticated by the system or a user, and it can be edited when necessary, such as extending, removing, and etc. If the determining result of the step S2133 is YES, then it is indicated this newly-created process is secure and is not required to be monitored, thus it is filtered out (step 2138). Otherwise, it is further determined whether the executable file is a system file (step S2135), and if so, the procedure goes to the step S2138. If the executable file is not a system file, it is further determined whether the executable file is in a list of secure programs to be filtered out by default (step S2137). If so, the procedure goes to the step S2138; otherwise, the procedure goes to step S2139, where the process is determined to be suspicious and a process set is required to be created for it. As described above, in the filtering step S213, some secure programs may be filtered out to avoid creating unnecessary process sets, in order to accelerate the speed of behavior analysis by the protection software. In the process filtering step, other modes, such as some rules for determining secure programs, may be used. In some special cases, the filtering step may be omitted.

Here, after the filtering, if the "Backdoor.GPigeon" program "A.exe" neither exists in the secure program list, nor is a system file or a default secure program, then it is determined in the filtering step that the process "A.exe" is a suspicious process and a corresponding process set is required to be created. Thus, the procedure proceeds to step S215, where a new process set α is created, the first correlated process in the set α is set to be the process ID of "A.exe", and the associated file information is set to be the PE file full path information "c:\A.exe" of "A.exe". Then this set maintenance procedure ends.

If the process set containing the parent process is found in the step S211, then the procedure goes to step S217. For example, the monitoring module 100 detects that the "Backdoor.GPigeon" program "A.exe" starts its replica "wservices.exe" which is copied to the system directory, that is, it detects a process creating action. At this point, the parent process "A.exe" of "wservices.exe" has already existed in the process set α, and thus the procedure goes to the step S217, where the process ID of "wservices.exe" is written into an historical process list of the set α as the second correlated process of the set, meanwhile file information "c:\windows\wservices.exe" of the second correlated process is stored in the historical process list, and then, this set maintenance procedure ends.

If it is determined that the received notification is a process terminating notification in the step S203, for example, it detects that the "Backdoor.GPigeon" program "A.exe" exits after starting "wservices.exe", then the procedure goes to step S222, where it is determined first whether a process set corresponding to the parent process of the terminated process exists. For the "Backdoor.GPigeon" program "A.exe", the process set containing the parent process does not exist. Then the procedure proceeds to step S224, where it is further determined whether a process set containing the terminated process exists, and the processing procedure ends if the determining result is NO. Here, the process set a containing "A.exe" is found by the determination. Then the currently-terminated process "A.exe" is removed from the set α (step S226). After removing the process, it is further determined whether there is still a suspicious process in the set α (step S228). If there is no suspicious process, then the set α is revoked or destroyed (step S229). In the example of the "Backdoor.GPigeon", the determining result in the step S228 is NO and the processing procedure ends, because "wservices.exe" is still running when "A.exe" exits.

With reference to the above description in conjunction with FIGS. 2 and 3, the process set can be established at the beginning of the creation of the suspicious process and the associated information in the set is updated continuously with the creation and termination of the correlated processes.

Therefore, the process set may provide valuable information regarding correlation between the processes to the processing sub-modules for other action notifications. Meanwhile, procedures for processing other action notifications may also write actions or data in their respective processing into historical records, so as to increase the amount of the correlation information.

The specific application of the process set proposed in the present invention in the sub-modules for the respective action notifications will be described with reference to FIGS. 4-8 respectively.

Figure 4:
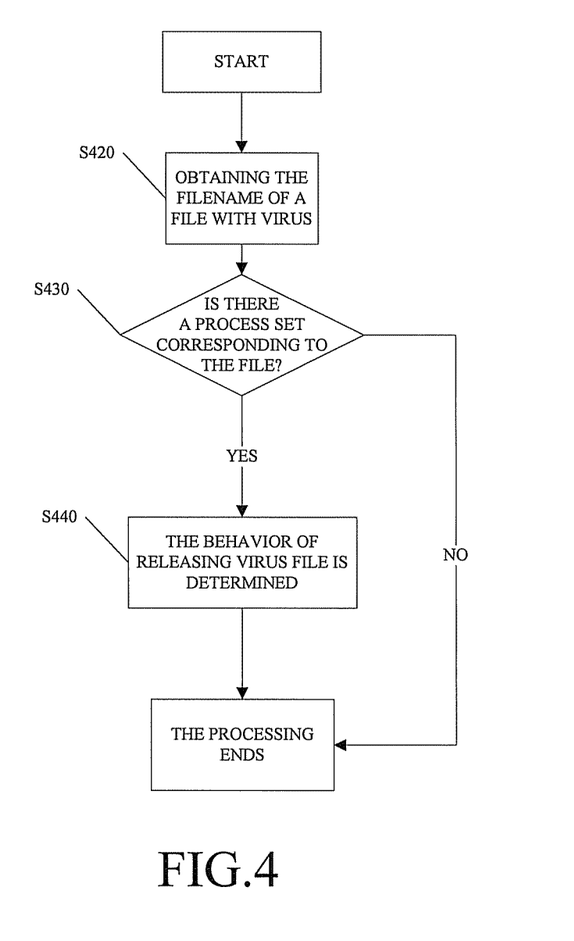
FIG. 4 illustrates a procedure of determining a process releasing a virus file using a process set in accordance with one embodiment of the present invention.

FIG. 4 illustrates a processing procedure of the virus-scanning engine notification processing sub-module. The procedure shown in FIG. 4 will be described in conjunction with a Trojan.

Assuming that a known Trojan A releases a known virus dynamic link library B when running. Since both the Trojan A and the dynamic link library B are known virus files, they can be recognized accurately by the traditional signature scanning. However, the Trojan A is prone to mutating and disguising (e.g., by various means, such as packing, encryption, PEPatch, signature modification, and etc.), the traditional signature scanning is unable to detect the disguised Trojan A', while the dynamic link library B typically does not perform disguising and thus can be found by the virus-scanning engine.

In the above example of the Trojan, assuming that after the disguised Trojan A' runs and releases the dynamic link library B, the virus-scanning engine finds out the dynamic link library B by the virus signature scanning, and thus sends a notification that a virus is detected. At this point, the sub-module 400 receives the notification, and first obtains the full path of the detected virus file, i.e., the dynamic link library B (step S420), and then searches within all process sets maintained by the sub-module 200 to find out a process set containing the virus file (step S430). At this point, because the Trojan A' is running, the sub-module 200 has established a process set S for it upon the creation of A', and a file created by A', i.e. the dynamic link library B, is contained in historical records of the set S. Therefore, the process set S containing the virus file, i.e. the dynamic link library B, can be found in the step S430. Based on this determination, it could be determined that the virus file is released by the process A' in the process set S, that is, the behavior of releasing virus file is determined (step S440), such that the disguised Trojan A' is found successfully.

The virus-scanning engine notification processing sub-procedure shown in FIG. 4 combines the traditional real-time file monitoring which is based on signature scanning with malicious behavior characteristic analysis which is based on the process set proposed in the present invention. This processing not only utilizes the existing accurate virus-scanning technologies quite effectively, but also makes full use of the correlation between files and processes provided by the process set. Thus, the processing is capable of detecting malicious behavior more quickly and accurately while helping to detect more derivatives of computer viruses.

Figure 5:
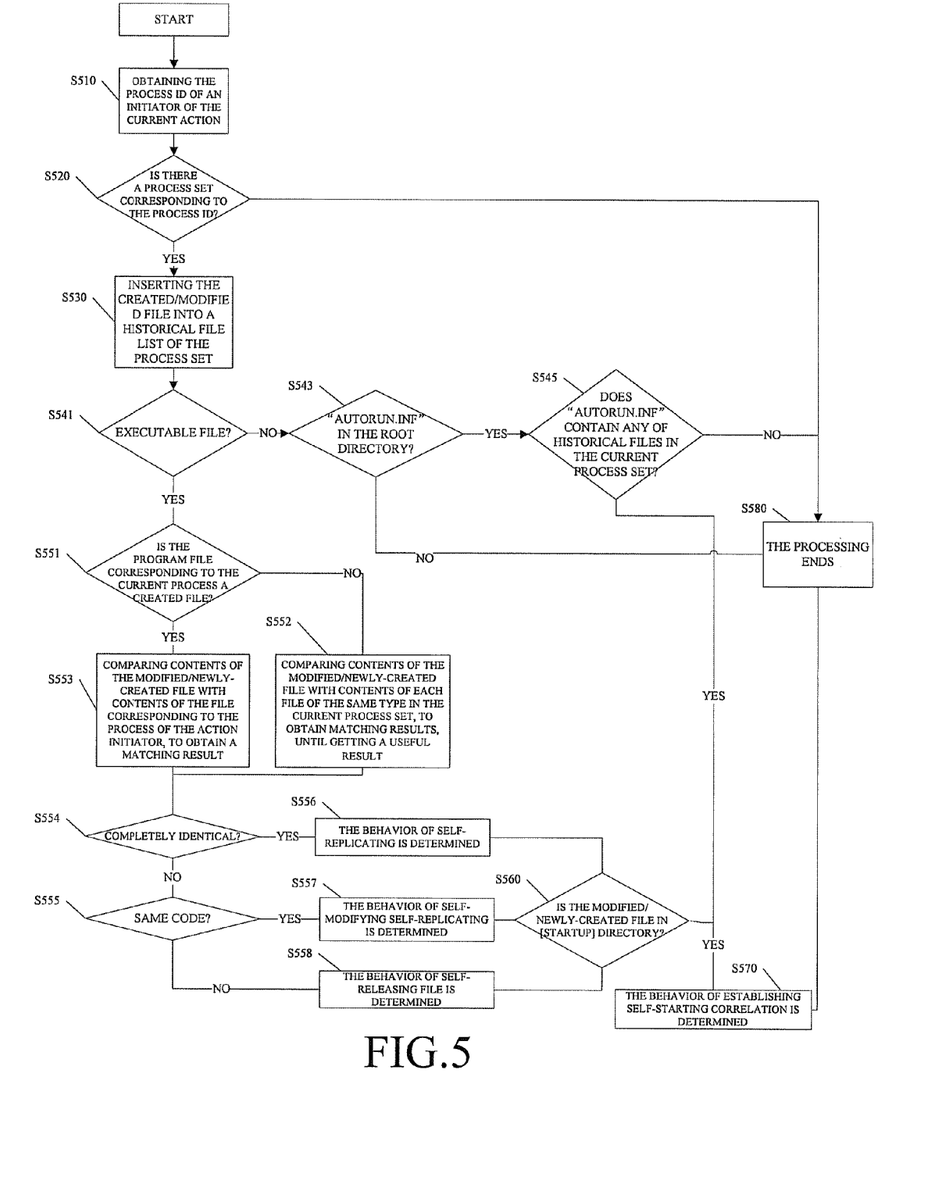
FIG. 5 illustrates a procedure of determining malicious behavior during a file operation using a process set in accordance with one embodiment of the present invention.

FIG. 5 illustrates a processing procedure of the file operation notification processing sub-module 500. Taking the virus "Worm.WhBoy" as an example, the whole procedure of file operation notification processing will be described below. The virus "Worm.WhBoy", which is a type of computer worms, can infect normal executable files. Specifically, this virus replaces the original executable program with its own code and then appends the original program to its own code, while using a program icon of the original program as its own program icon so as to confuse the user and conceal itself. This kind of behavior may be abstracted as the "self-modifying self-replicating" described above.

In actual operation, after started, the main program "Panda.exe" of the virus "Worm.Whboy" will modify an executable file "E.exe" as described above, i.e., performing a file modification action, which will be detected by the monitoring module 100. As shown in FIG. 5, after receiving a file operation notification that a file is created or modified, the sub-module 500 first obtains the process ID of an initiator of the current file operation action, i.e., the process ID of "Panda.exe" (step S510). Then, it searches all process sets for a process set containing the current process "Panda.exe" based on the obtained process ID (step S520). If the set can not be found, then it is indicated that the current process is secure and its file operation is credible as well, and then this processing procedure ends. In this example, assuming that the sub-module 200 has already established a process set β for "Panda.exe" at the beginning of its creation, then the procedure goes to step S530. In the step S30, information of the created/modified file "E.exe" is inserted into historical records of the found process set β in order to record historical actions of the monitored process. Here, if storage space of historical files of the set is full or the insertion fails (not shown in the figure), then the processing procedure ends directly (step S580).

Then, the sub-module 500 determines whether the created/modified file is an executable file (step S541) or an automatic-running file (step S43). If this file is an automatic-running file "Autorun.inf", then it determines whether a file recorded in "Autorun.inf" is contained in the historical records of the found process set β, i.e., determining whether a historical file is correlated with the automatic-running file. If so, it is indicated that the process set implements the behavior of "self-starting correlation" (step S570); otherwise, it is indicated that the file operation is secure, and then the processing procedure ends (step S580).

In the example of the "Worm.WhBoy", the modified file "E.exe" is an executable file, and thus the procedure goes to step S551, where it is further determined whether the program file of the current process is a created file. If not, then it is indicated that the current process may be a system file called by a virus. At this point, the created/modified file is required to be compared with content of each file of the same type in the process set containing the current process, to obtain matching results (step S552). In the example of the "Worm.WhBoy", based on the determination in the step S551, the current process "Panda.exe" is also a created file, thus the procedure goes to step S553, where the created/modified file is compared with contents of the program file corresponding to the current process to obtain a matching result.

In the matching performed in the step S552 and S553, not only the whole contents of the files are needed to be matched, but also code areas are needed to be matched individually. Only in this way, the virus "Worm.WhBoy" can be detected. Taking the PE file format in the Windows operating system as an example, specific steps of matching the code areas between two program files are as follows:
  analyzing the structure of the PE files, to obtain program entry points of the two program files;
  analyzing the Section Tables of the PE files, to find Sections where the two program entry points are located, respectively;
  comparing Section information (Section size) within the Sections; and
  obtaining contents of the Sections where the two program entry points are located to perform binary comparison, and if they are identical, it is indicated that the two programs have the same code area.

After the matching in the steps S552 and S553, three types of matching results may be obtained: the contents of the files are completely identical, only the code areas are same, or the files are different. Then, the sub-module S500 identifies malicious behavior based on the matching results of the step S552 and S553. If the matching results indicate "different", the behavior of self-releasing file is determined (step S558). If the matching results indicate "completely identical" (step S554), then the behavior of self-replicating is determined (step S556). In the example of the "Worm.WhBoy", since the matching results are that only the code areas are same (step S555), the behavior of self-modifying self-replicating is determined (step S557). Next, whether the created/modified file is in a startup directory could be further determined, on the basis of the determining results of the steps S556-558 (step S560). If in the startup directory, the behavior of self-starting correlation may be further determined (step S570).

In the sub-procedure as shown in FIG. 5, the file operation performed by the process is recorded into the historical records of the corresponding process set for use in subsequent correlation analysis. Meanwhile, it could be determined whether the behavior of the current process is malicious behavior, by comparing the file operated by the current process with historical files of the same type recorded in the process set. Here, the process set provides file correlation between the monitored processes. Thus, using the method shown in FIG. 5, the accuracy and speed of recognizing malicious behavior may be improved.

Figure 6:
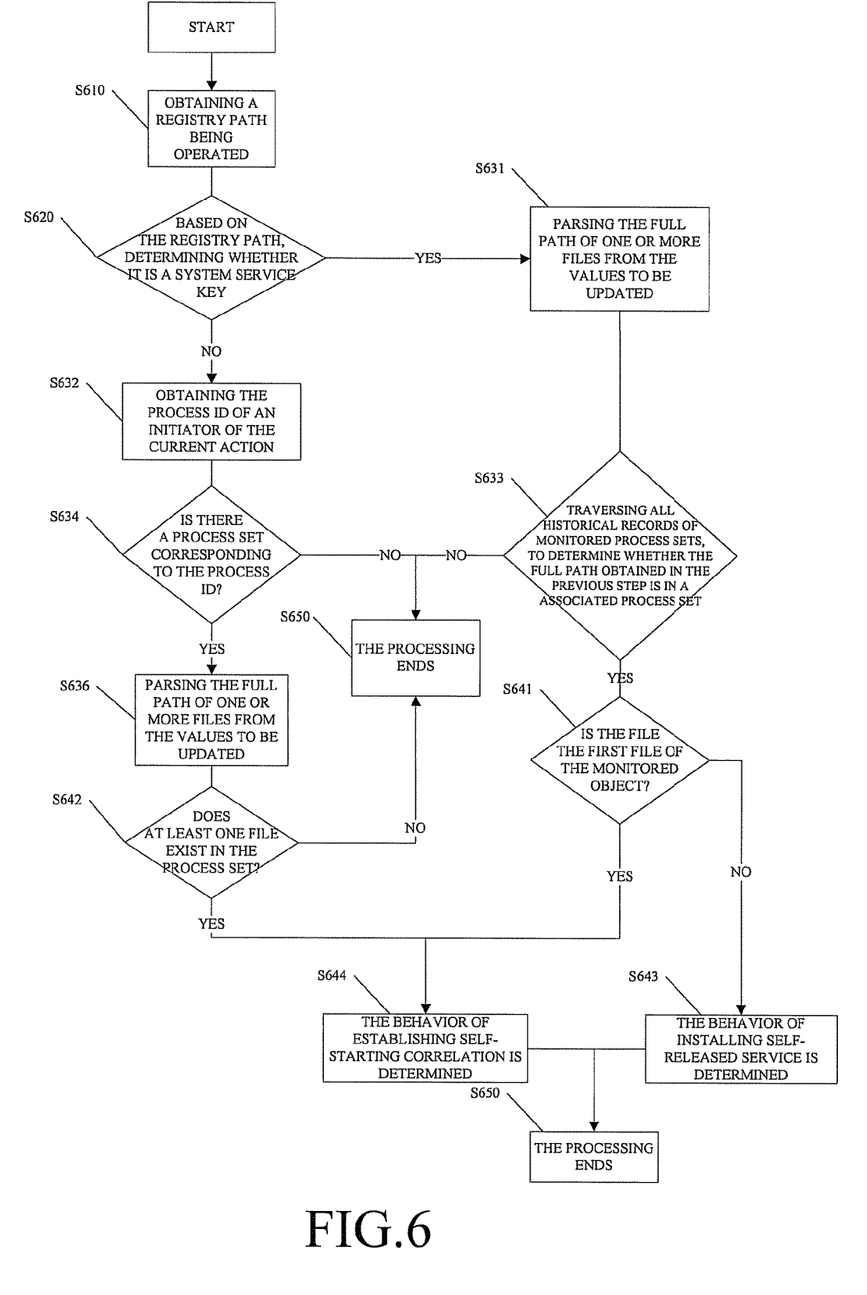
FIG. 6 illustrates a procedure of determining malicious behavior during a registry operation using a process set in accordance with one embodiment of the present invention.

FIG. 6 illustrates a processing procedure of the registry operation notification processing sub-module 600. The processing procedure of the sub-module 600 is described by taking a virus A as an example. Assuming that after the virus A is started, a malicious program file "B.exe" is released, and then the program B is added into the self-starting items by modifying the registry such that the program B can be started by itself. According to the processing procedure of the process set maintaining sub-module as above, the sub-module 200 has established a process set γ for the virus A upon creation of the process of the virus A. Moreover, according to the processing procedure of the file operation notification processing sub-module, the program B released by the virus A will also be recorded in the set γ as a historical file. Then, when the virus A modifies the registry, the monitoring module may monitor this action and send a registry operation notification.

As shown in FIG. 6, after receiving the registry operation notification, the sub-module 600 first obtains a registry path being operated (step S610). Then, it determines whether the registry path corresponds to a system service key, based on the registry path (step S620). If not, the behavior may be a registry modifying action initiated by a virus itself, and the procedure goes to step S632. Otherwise, the behavior may be an action for starting system service and it is required to further determine whether the started service is secure, and thus the procedure goes to step S631.

In the step 631, the full path of one or more files is parsed from the registry values to be updated, i.e., a file to be started is obtained. Then, the sub-module 600 searches the historical records of all process sets to determine whether the file obtained in the previous step is contained in a process set (step S633). If not, then it is indicated that it is secure to start the file and the procedure ends (step S650). If the determining result is YES, then it is indicated that the file to be started is released by a suspicious process in the process set, and the procedure goes to step S641, where it is further determined whether this file is the first file in the process set obtained in the previous step. If the determining result is YES, then the behavior of installing self-released service is determined (step S643).

In the example of the virus A, if the registry path is not the system service key, the procedure goes to step S632, where the sub-module 600 obtains a process ID of an initiator of the current registry modifying action, i.e., the process ID of the virus A. Then, all process sets are searched for the set containing the current process based on the obtained process ID (step S634), to find the process set γ containing the virus A. Then the procedure goes to step S636, where the full path of one or more files to be started is obtained. Then the obtained file "B.exe" to be started is found to be within the set γ based on the determination in the step S642. Then it may be confirmed that the current registry operation belong to the behavior of establishing self-starting correlation, which is initiated by the virus A (step S644).

In the processing procedure shown in FIG. 6, when the initiator of some operations is a program run automatically by the system, based on the current process ID, the process set relating thereto possibly could not be obtained. However, since the process set proposed in the present invention contains the historical records of the process actions, the associated process set may be obtained by searching for object files of these operations within historical files of all process sets, and then a further analysis may be performed based on the obtained process set.

Figure 7:
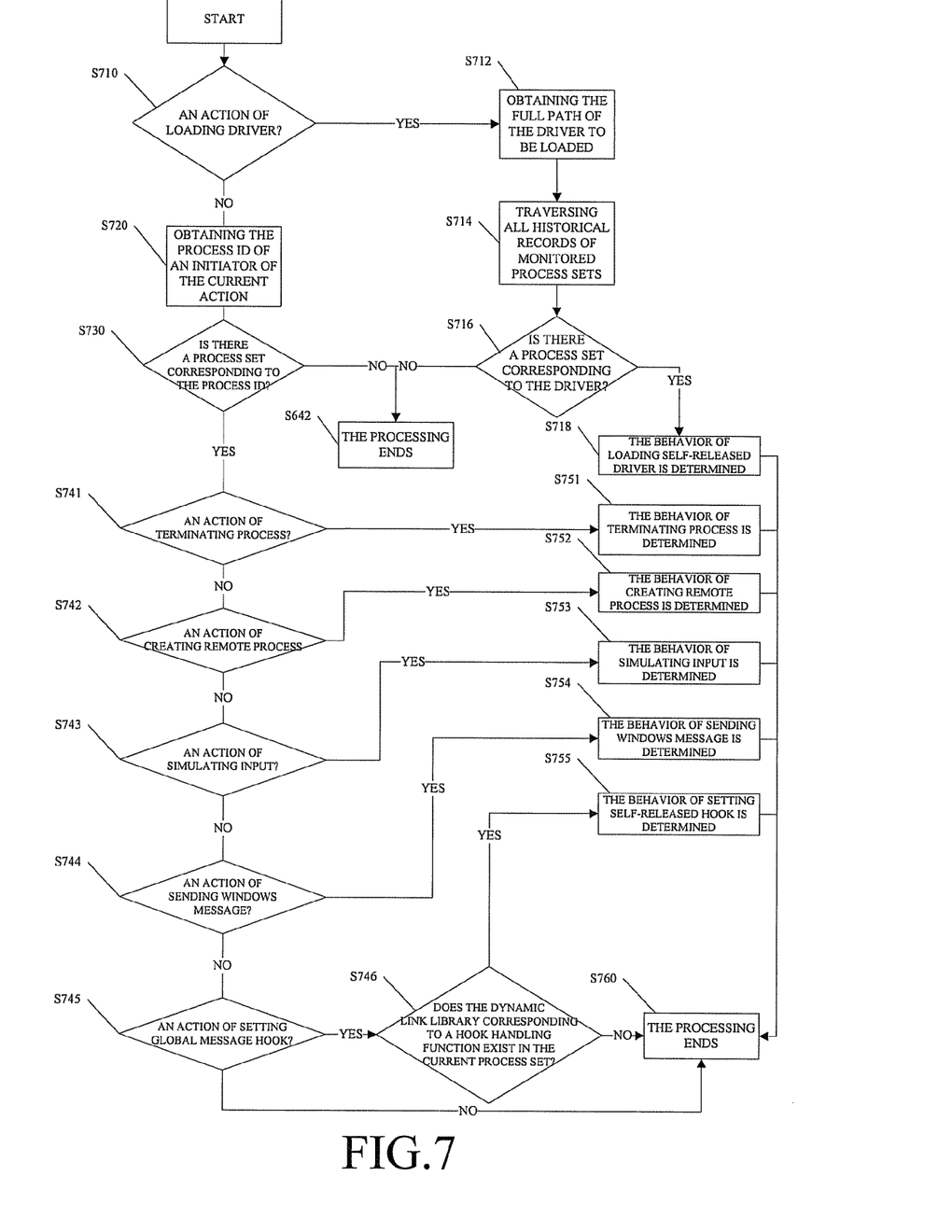
FIG. 7 illustrates a procedure of determining malicious behavior during a system call using a process set in accordance with one embodiment of the present invention.
Figure 8:
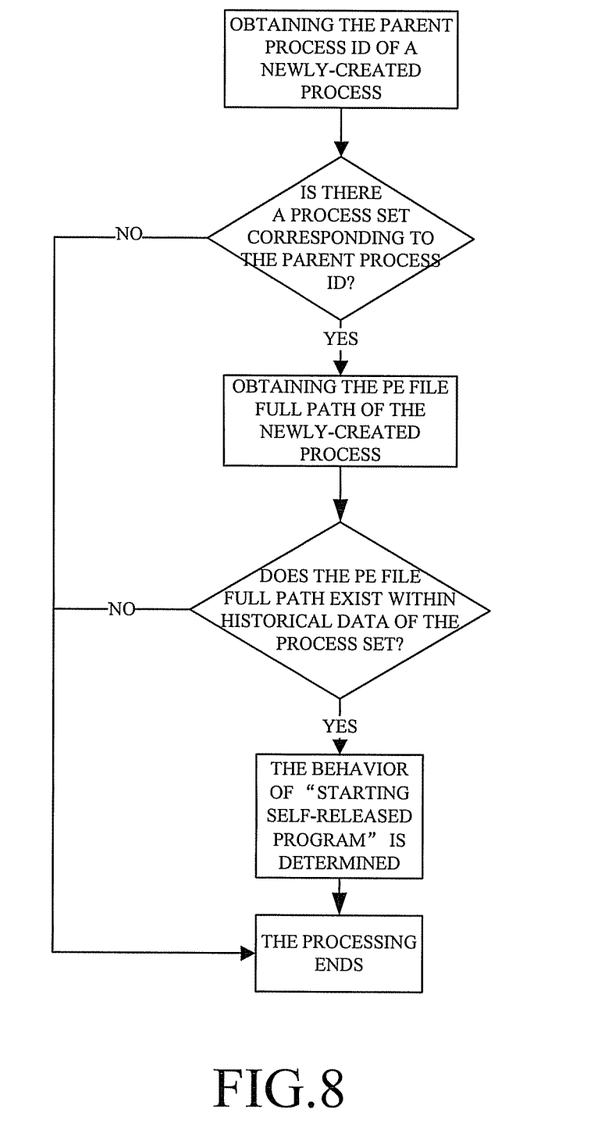
FIG. 8 illustrates another exemplary procedure of determining malicious behavior of a program using a process set in accordance with one embodiment of the present invention.

FIG. 7 illustrates a processing procedure of the system call notification processing sub-module 700. The procedure of system call notification processing will be described by taking the Trojan A as an example. Assuming that the Trojan "A.exe" is a malicious program that infringes on a computer by "loading self-released driver". After the Trojan "A.exe" is started, the sub-module 200 creates a process set S for it. Upon running, "A.exe" releases a driver C, full path information of which is recorded in the monitored process set S by the sub-module 500. Then, "A.exe" calls the service related API, to create a service registry item for the program C and start this service. The operations of creating the registry and starting the service are initiated by a system process "services-.exe" that has already existed in the system. At this point, the monitoring module may detect this driver loading action and send a corresponding notification.

After obtaining the system call notification, the sub-module 700 first determines whether the notification is a driver loading notification (step S710). If the notification is determined to be a notification of loading the driver C, the full path of the driver C is obtained from the notification (step S712), and based on the full path of the driver C, the historical records of all process sets are searched for the same file (step S714), thus the driver C is found to be within the corresponding process set S (step S716). Therefore, it is determined that "A.exe" in the set S performs the behavior of "loading self-released driver" when running (step S718).

In the example of the Trojan, since the initiator of the driver loading action is a system process that has run for a long time, it couldn't be determined whether there exists a corresponding monitored process set, according to the process ID of the initiator. In this regard, according to the present invention, the historical records of the monitored process sets are searched for information of an object of the loading action, i.e., information of the driver C, thereby finding out the associated process set.

In addition to the system call for driver loading as described above, the system call notification processing sub-module shown in FIG. 6 can process other system call notifications which may be malicious behavior. For instance, as shown in FIG. 6, when the received system call notification is not a driver loading action, the process ID of the initiator of the current action is obtained (step S720) and a corresponding process set is found based on the obtained process ID (step S730). If the corresponding process set is found, then it is indicated that such system call is initiated by a suspicious process in the process set. Then, based on the specific system call actions (step S741-745), the corresponding malicious behavior is determined (S751-755). For example, when the system call is an operation for setting global message hook (step S745), the sub-module 700 further determines whether a dynamic link library corresponding to a hook handling function is in the monitored process set containing the current process (step S746). If in the set, the behavior of setting self-released hook could be confirmed (step S755).

The procedures where the sub-modules 400-700 detect the malicious behavior based on the correlation between the processes and between the processes and the files provided by the process set are described above in conjunction with the drawings. The operations of these sub-modules described above are not isolated, and they may overlap each other. In another words, the same malicious behavior may be detected in more than one module. For example, the method of determining the behavior of starting self-released program is illustrated in FIG. 5. However, such behavior can also be recognized according to a process creating notification. For instance, when the protection software sends the process creating notification, it could be further determined whether the program file corresponding to the created process is in the process set containing the parent process of the created process, after the maintenance of the process set as shown in FIG. 2. If in the set, the behavior of "starting self-released program" could be determined (the specific procedure can be seen in FIG. 8).

Beneficial Effect

The creation, maintenance and utilization of the process set proposed in the present invention are described in detail above in conjunction with specific embodiments. The process set proposed in the present invention means that a plurality of processes correlated with each other in creating relationships are grouped into a set and historical data of each process in the set is recorded. Therefore, the concept of the process set proposed in the present invention embodies both the correlation between the respective processes and the correlation between a process and an action, such as a file operation. The correlation information may allow several discrete actions, such as process creating, system call, file operation, and etc., to be correlated with each other, in order to recognize malicious behavior therein. Thus, the process set actually is an individual at a logical level, which embodies the malicious behavior. Therefore, using the process set to detect malicious behavior will be more accurate.

In addition, the process set proposed in the present invention is established after filtering. Thus, after the filtering, an original parent-child relationship provided by the system may be ignored, and a corresponding process set is established directly for a suspicious child process.

For example, a user interface program "explorer.exe" creates both "a.exe" and "b.exe". According to generation relationship between the processes provided by the system, there is a sibling relationship between "a.exe" and "b.exe". However, according to the process set creating principle proposed in the present invention, the parent process "explorer.exe" is a secure process and will not be monitored, while "a.exe" and "b.exe" created by it may involve different malicious behavior and thus belong respectively to two process sets different from each other. Therefore, there is no any relationship between "a.exe" and "b.exe". Thus, after the process filtering, the original generation relationship between the respective processes is converted into logical relationship.

Furthermore, positions of the plurality of processes in the process set are equal to each other. Such a simple structure facilitates ease of the maintenance and rapidness of the search for the process set. These advantages are particularly suitable for requirements of a real-time monitoring system, and the influence on performances of a computer due to unduly-complicated behavior analysis, which hinders a user in normal use, is avoided.

Although the present invention is illustrated and described with regard to the preferred embodiments, it will be understood by those skilled in the art that many variations and modifications may be made without departing from the spirit and scope of the present invention defined by the following claims.

What is claimed is:

1. A method performed by a computer device for detecting malicious behavior of a computer program, comprising:

monitoring an action executed by the computer program running on the computer device;

searching for a monitored process set associated with the monitored action within a library of monitored process sets, wherein the monitored process set includes information of at least two suspicious processes correlated with each other in creating relationships and logically embodies a common behavior of the two or more suspicious correlated processes contained therein, wherein the monitored process set includes process identifiers of the at least two suspicious processes, program files corresponding to the at least two suspicious processes, actions performed by the at least two suspicious processes, and historical records of data generated by the actions; and if the monitored process set associated with the monitored action is found, judging whether the monitored action belongs to malicious behavior by correlation analysis based on information recorded in the monitored process set found, wherein the monitored process set found, which is associated with the monitored action, includes information of a process initiating the monitored action, wherein the judging step comprises:

comparing information of an object of the monitored action with the historical records in the monitored process set found, wherein the object of the monitored action is a file operated by the monitored action, wherein comparing includes comparing the file operated by the monitored action with file contents of historical files in the historical records, wherein the files being compared are all executable files, wherein comparing the file operated by the monitored action with file contents of historical files in the historical records further comprises comparing the file operated by the monitored action with contents of code areas of the historical files in the historical records, wherein comparing the file operated by the monitored action with contents of code areas of the historical files in the historical records comprises analyzing structures of two executable files being compared, to obtain program entry points of the executable files, analyzing section tables of the executable files, to find sections where the program entry points of the executable files are located, respectively, comparing sizes of the found sections of the two executable files, obtaining contents of the sections where the program entry points of the two executable files are located, to perform binary comparison, and if the contents of the sections are identical, then determining that the two executable files have the same code area: and judging whether the monitored action belongs to malicious behavior based on the comparing result.

2. The method according to claim 1, wherein when a process is created, if a parent process of the newly-created process is a suspicious process in a monitored process set, then the newly-created process is determined as a suspicious process and is added to the monitored process set containing the parent process.

3. The method according to claim 1, wherein when a process is created, if a parent process of the newly-created process is not a suspicious process, then a monitored process set corresponding to the newly-created process is established only if the newly-created process is determined as a suspicious process after process filtering.

4. The method according to claim 3, wherein the process filtering comprises:

judging whether or not a program file corresponding to the newly-created process is a known secure program file, a system file or a default secure program file; and if not, determining that the newly-created process is a suspicious process.

5. The method according to claim 1, wherein the object of the monitored action is a file operated by the monitored action, and the comparing step comprises comparing the file operated by the monitored action with full path information of historical files in the historical records.

6. The method according to claim 1, wherein the judging step further comprises:

judging whether the monitored action belongs to a system call which possibly results in malicious behavior.

7. The method according to claim 1, wherein the monitored process set found, which is associated with the monitored action, further includes information of an object of the monitored action.

8. The method according to claim 1, wherein the object of the monitored action is a file operated by the monitored action, and the searching step comprises searching for information of the file operated by the monitored action within the historical records of all the monitored process sets.

9. The method according to claim 1, wherein the step of monitoring an action executed by the computer program further comprises an action of an antivirus engine having detected a virus, and the searching step comprises searching, within the historical records, for a monitored process set containing information of a virus file where the virus is detected, based on the information of the virus file where the virus is detected.

10. An apparatus for detecting malicious behavior of a computer program, comprising a computer device configured to:

monitor an action executed by the computer program running on the computer device;

search for a monitored process set associated with the monitored action within a library of monitored process sets, wherein the monitored process set includes information of at least two suspicious processes correlated with each other in creating relationships and logically embodies a common behavior of two or more suspicious correlated processes contained therein, wherein the monitored process set includes process identifiers of the at least two suspicious processes, program files corresponding to the at least two suspicious processes, actions performed by the at least two suspicious processes, and historical records of data generated by the actions; and if the monitored process set associated with the monitored action is found, judge whether the monitored action belongs to malicious behavior by correlation analysis based on information recorded in the monitored process set found, wherein the monitored process set found, which is associated with the monitored action, includes information of a process initiating the monitored action, wherein the judging step comprises:

comparing information of an object of the monitored action with the historical records in the monitored process set found, wherein the object of the monitored action is a file operated by the monitored action, wherein comparing includes comparing the file operated by the monitored action with file contents of historical files in the historical records, wherein the files being compared are all executable files, wherein comparing the file operated by the monitored action with file contents of historical files in the historical records further comprises comparing the file operated by the monitored action with contents of code areas of the historical files in the historical records, wherein comparing the file operated by the monitored action with contents of code areas of the historical files in the historical records comprises analyzing structures of two executable files being compared, to obtain program entry points of the executable files, analyzing section tables of the executable files, to find sections where the program entry points of the executable files are located, respectively, comparing sizes of the found sections of the two executable files, obtaining contents of the sections where the program entry points of the two executable files are located, to perform binary comparison, and if the contents of the sections are identical, then determining that the two executable files have the same code area; and judging whether the monitored action belongs to malicious behavior based on the comparing result.

11. The apparatus according to claim 10, wherein the computer device is further configured to:
if a parent process of a newly-created process is a suspicious process in a monitored process set, then determine the newly-created process as a suspicious process and allow the monitored process set to be created for it, and if the parent process of the newly-created process is not a suspicious process and a program file corresponding to the newly-created process is a secure file, then filter out the newly-created process and not allow a monitored process set to be created for it.

12. The apparatus according to claim 10, wherein the action monitored further comprises an action of an antivirus engine having detected a virus, and the computer device is configured to search within the historical records, for a monitored process set containing information of a virus file where the virus is detected, based on the information of the virus file where the virus is detected.

13. The apparatus according to claim 10, wherein the monitored process set found, which is associated with the monitored action, includes information of an object of the monitored action.

* * * * *